(12) United States Patent
Dangler

(10) Patent No.: US 7,100,957 B1
(45) Date of Patent: Sep. 5, 2006

(54) CAB AIR FAIRING CARGO CADDY SYSTEM

(75) Inventor: Rex D. Dangler, Cecil, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/381,180

(22) Filed: May 2, 2006

Related U.S. Application Data

(62) Division of application No. 11/127,426, filed on May 11, 2005.

(51) Int. Cl.
*B60R 9/04* (2006.01)

(52) U.S. Cl. .................................................. 296/37.6

(58) Field of Classification Search ............... 296/37.6, 296/37.7, 37.1, 180.1–180.5; 224/400, 309, 224/316
See application file for complete search history.

(56) References Cited

U.S. PATENT DOCUMENTS

| | | | | |
|---|---|---|---|---|
| 2,914,231 A | * | 11/1959 | Hornke | 224/316 |
| 3,146,018 A | * | 8/1964 | Pearlman | 296/26.06 |
| 3,612,599 A | * | 10/1971 | Sternberg | 296/190.02 |
| 4,201,415 A | * | 5/1980 | Suchanek | 296/190.02 |
| 4,351,554 A | * | 9/1982 | Miller | 296/190.02 |
| 4,775,179 A | * | 10/1988 | Riggs | 296/180.2 |
| 4,867,361 A | * | 9/1989 | Burnham | 224/310 |
| 5,553,760 A | * | 9/1996 | Wright et al. | 224/316 |
| 5,560,673 A | * | 10/1996 | Angelo | 296/26.02 |
| 5,996,867 A | * | 12/1999 | Burgess et al. | 224/316 |
| 6,276,736 B1 | * | 8/2001 | Cook et al. | 296/37.6 |
| 6,772,926 B1 | * | 8/2004 | Eichele et al. | 224/316 |

* cited by examiner

*Primary Examiner*—H Gutman
(74) *Attorney, Agent, or Firm*—Jeffrey P. Calfa; Gerald W. Askew; Dennis K. Sullivan

(57) ABSTRACT

A storage or cargo caddy system designed to fit into or supplant an air fairing of a ground traveling vehicle. Means for loading, unloading, attachment, and access to the storage system are disclosed. Use of the storage or cargo caddy system more efficiently utilizes the space occupied by air fairings on cargo-carrying vehicles currently, and provides for Less Than full-Load capacity.

1 Claim, 10 Drawing Sheets

Figure 1:
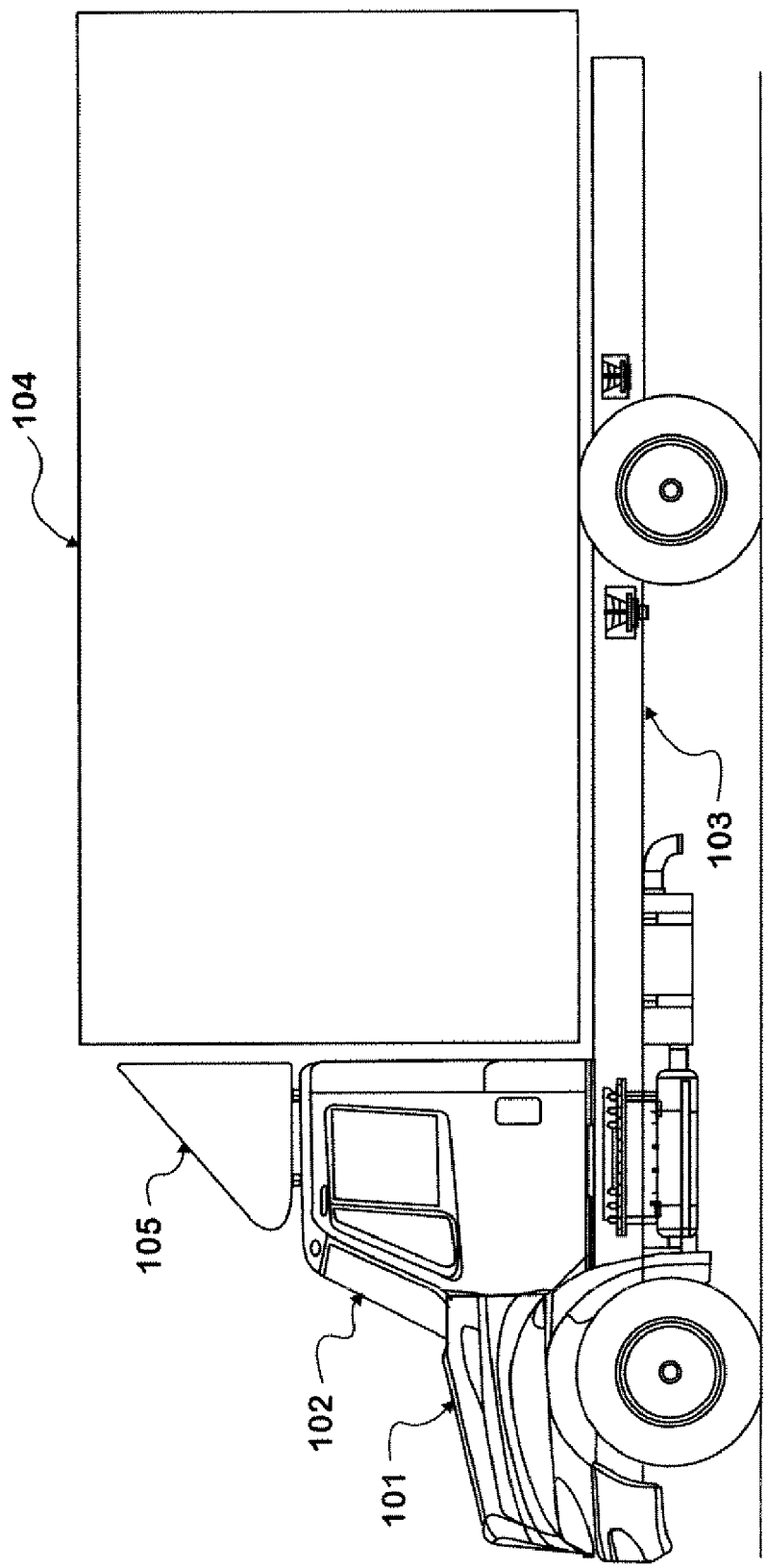

VEHICLE CAB HAVING AN
AERODYNAMIC AIR FAIRING
WITH A PERPENDICULAR DOOR

HIGHWAY TRACTOR WITH AN AERODYNAMIC AIR FAIRING

VEHICLE CAB HAVING AN
AERODYNAMIC AIR FAIRING
WITH A CARGO CONTAINER

VEHICLE HAVING AN AERODYNAMIC CARGO CONTAINER IN LIEU OF AN AIR FAIRING

CUTAWAY VEHICLE CAB
HAVING PARTIALLY INTEGRATED
AERODYNAMIC AIR FAIRING

VEHICLE CAB HAVING AN
AERODYNAMIC AIR FAIRING
WITH A PERPENDICULAR DOOR

VEHICLE CAB HAVING A
CARGO CONTAINER LATCHING
MECHANISM HAVING A TELL-TALE

VEHICLE HAVING AN AERODYNAMIC AIR FAIRING, AN AIR FAIRING CARGO CONTAINER, AND A CRANE

AIR FAIRING CARGO CONTAINER
WITH MULTIPLE STORAGE
CONFIGURATIONS

CAB AIR FAIRING CARGO CADDY SYSTEM

This is a division of application Ser. No. 11/127,426, filed May 11, 2005.

BACKGROUND OF INVENTION

This invention relates to a storage or cargo caddy system designed to fit into or supplant an air fairing of a ground traveling vehicle. Specifically, it is intended to be compatible with air fairings commonly used on trucks and semi-tractors, which function to present aerodynamic transition between the lesser height of the vehicle cab and the greater height of the cargo body or semi-trailer. The storage or cargo caddy system is modular in design, and is made to be easily inserted into and removed from the space defined by the air fairing.

SUMMARY

Mobile ground traveling vehicles are commonly configured either as a cargo-carrying trucks, or as highway tractors adapted to connect to and pull semi-trailers. The cargo-carrying truck variety of vehicle is typically provided with a separate cab and cargo section, both of which are attached to a chassis. Often, the cargo section of the vehicle is significantly taller than the cab section of the vehicle. In order to improve the aerodynamics of the vehicle, an air fairing is attached to the top of the cab section of the vehicle. This air fairing is sometimes integrated into the cab of the vehicle, so that the space that it contains is usable to the occupants of the vehicle cab. More often, however, it is merely attached to the top of the cab, and is hollow and open to the rear of the cab. The space that it defines in this configuration remains unoccupied. The invention disclosed herein is primarily concerned with the effective and efficient utilization of that space.

The highway tractor variety of vehicle is often provided with an air fairing as well. This is because the semi-trailer to which the highway tractor is adapted to be attached is often considerably taller than the cab of the highway tractor itself. In the same way as the air fairing of the cargo-carrying truck type of vehicle, the air fairing of the highway tractor is sometimes integrated into the cab of the vehicle, so that the space that it contains is usable to the occupants of the vehicle cab, and is sometimes merely attached to the top of the cab, being hollow and open to the rear of the cab.

Cargo-carrying trucks and highway tractors are primarily revenue-generating vehicles for the entities that purchase and maintain them. As a result, great effort is undertaken by the manufacturers of these vehicles to maximize their cargo carrying capacity within the constraints of weight, volume, fuel consumption, and vehicle cost. Additionally, the economic demand for efficient operation has essentially resulted in the preclusion of partial, or Less Than full-Load (LTL), shipping for operators other than parcel-delivery services. Yet in virtually all cargo-carrying trucks and highway tractors, the volume beneath the air fairing of the vehicle cab goes unoccupied.

The invention disclosed herein provides a way to more effectively use the volume defined by the vehicle cab air fairing by allowing for quick and easy insertion of a fitted, modular cargo container thereinto. Alternately, the vehicle cab air fairing may be entirely supplanted by an aerodynamic modular cargo container of substantially the same shape. In yet another form, the air fairing may be partially integrated into the cab, so that it is accessible to the occupants of the interior of the cab, and partially hollow and adapted to receive a fitted, modular cargo container.

When stowed, the cab air fairing cargo caddy system container latches securely to the top of the vehicle cab, so that it cannot separate from the vehicle cab in the event of an impact. Minimally, there are telltale indicators integrated into the latching system, so that it is readily apparent if the latching system is not in the locked-down state. The latching system may additionally have an interlock with the vehicle electrical system, so that the vehicle may not be driven unless the latching system is secured.

In order that the cab air fairing cargo caddy system container may be easily removed, several optional features may be present. In one embodiment, the cab air fairing cargo caddy system container has pockets for receiving fork-truck forks. In the case of the system involving the use of a fitted, modular cargo container within the vehicle cab air fairing intended to be removed by use of a fork-truck, means for egress is provided for the cab air fairing cargo caddy system container perpendicular to the vehicle, such as a door in the air fairing. In another embodiment, a means for the autonomous loading and unloading of the cab air fairing cargo caddy system container, such as a stanchion-crane, is utilized.

The cab air fairing cargo caddy system is intended for lightweight, small volume cargo, as compared to the cargo section of the truck or to the semi-trailer to which the highway tractor is adapted to be attached. It is naturally limited by the structure of the cab of the vehicle to which it is attached. It may be outfitted to receive miscellaneous light cargo, similar to the trunk of a passenger automobile, or it may be divided into sections, so that driver goods may be organized within. The cab air fairing cargo caddy system is water-resistant in order to keep goods within dry during inclement weather. It may be accessible when in the stowed position, either by means of a ladder located to the rear of the cab, or by means of a hatch in the top portion of the vehicle cab.

Whether applied to a cargo-carrying truck type of vehicle, or to a highway tractor type of vehicle, and whether embodied as a fitted, modular container insertable into an air fairing or as an aerodynamic modular cargo container intended to entirely supplant the air fairing, the cab air fairing cargo caddy system is designed to be interchangeable between vehicles. The cab air fairing cargo caddy system containers are inexpensively produced, possibly utilizing such techniques as Reaction Injection Molding, or vacuum molding. In this way, the containers may be rapidly interchanged, resulting in increased vehicle productivity.

The invention as presented is a solution to the problem of providing additional storage and a certain amount of Less Than full-Load (LTL) capability to cargo-carrying trucks and highway tractors. It is easy to remove and easy to stow. The latching system is secure and provides positive feedback so that the danger of it becoming detached while the vehicle is underway is eliminated. It is fully interchangeable with other vehicles so equipped, and provides a low-cost way to store and transport small, lightweight items.

The figures listed illustrate a vehicle with a cab air fairing cargo caddy system. Various embodiments of the cab air fairing cargo caddy system are shown, including a cargo container situated within an air fairing, an aerodynamic cargo container in lieu of an air fairing, and an air fairing partially open to the cab interior and partially adapted to receive a cargo container.

DRAWINGS

FIG. 1—A side view of a cargo-carrying truck having an air fairing.

Figure 2:
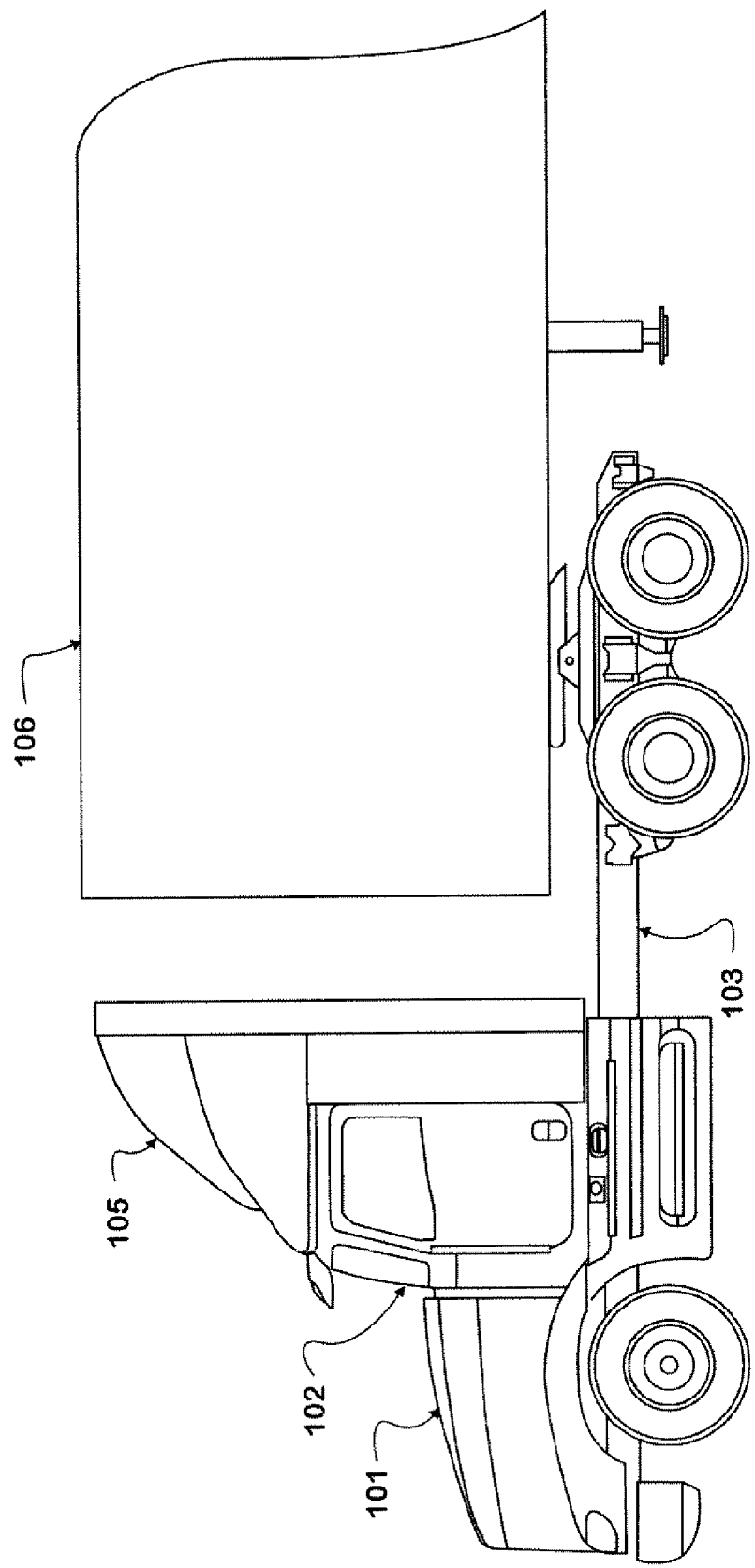

FIG. 2—A side view of a highway tractor adapted to be attached to a semi-trailer, the highway tractor having an air fairing.

Figure 3:
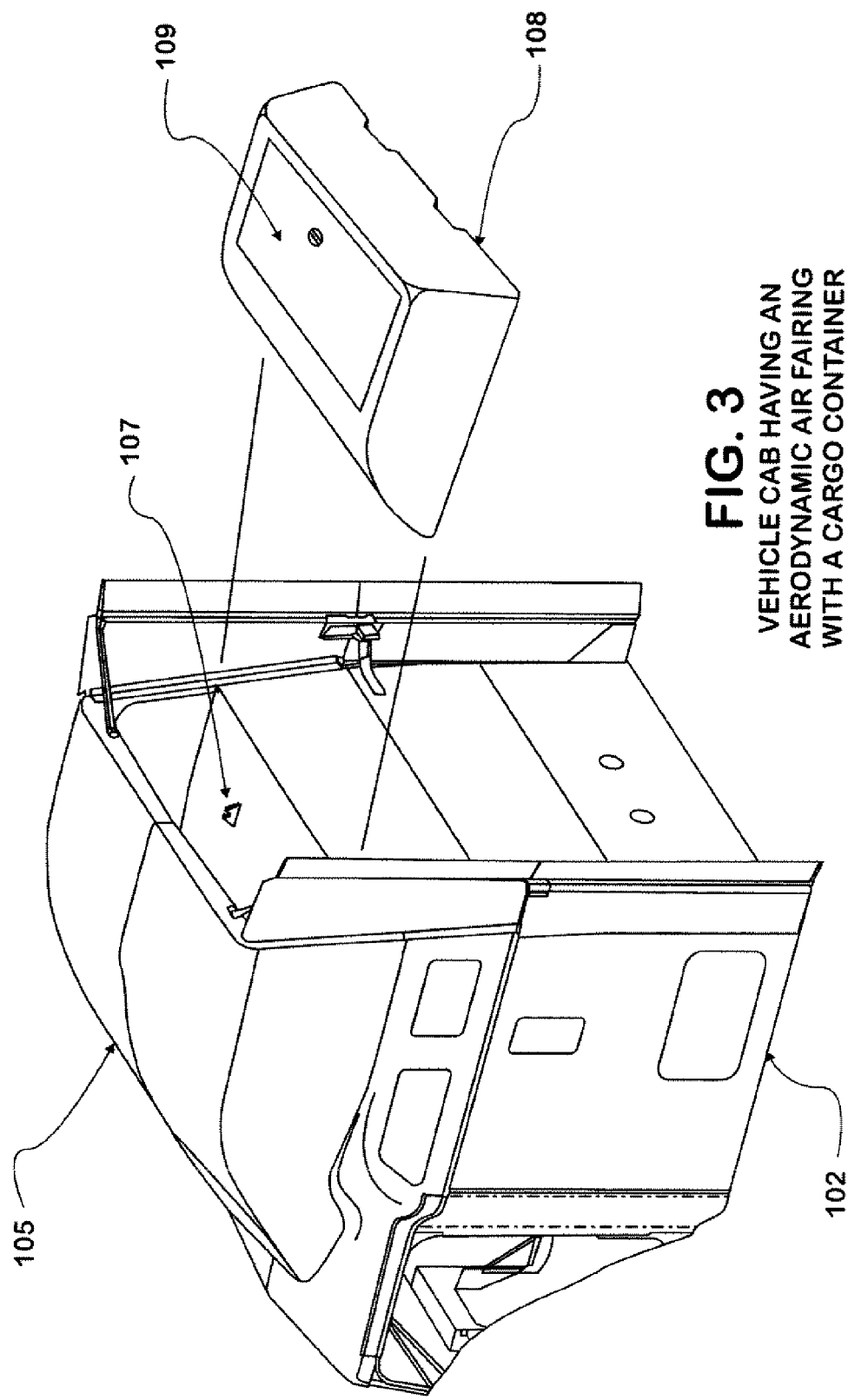
Figure 4:
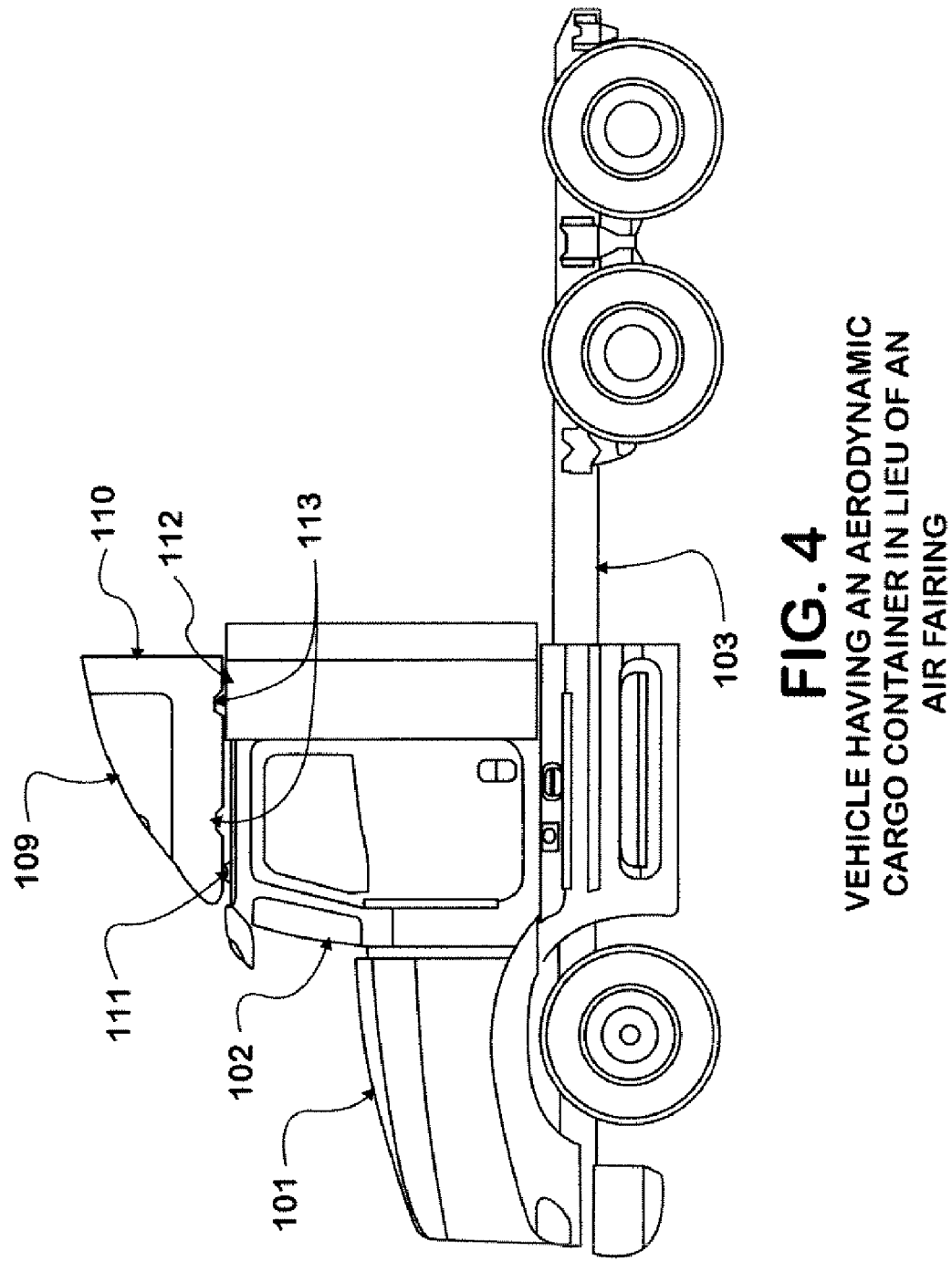
Figure 5:
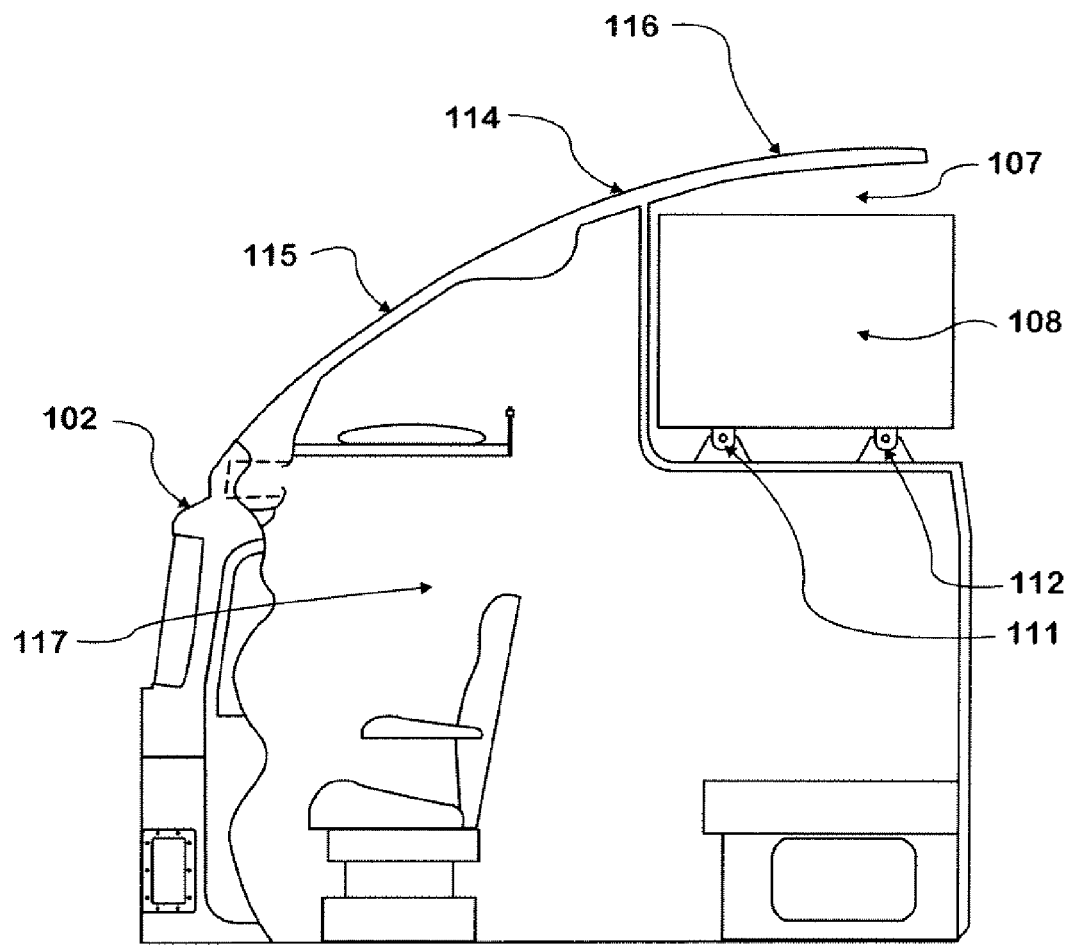
Figure 6:
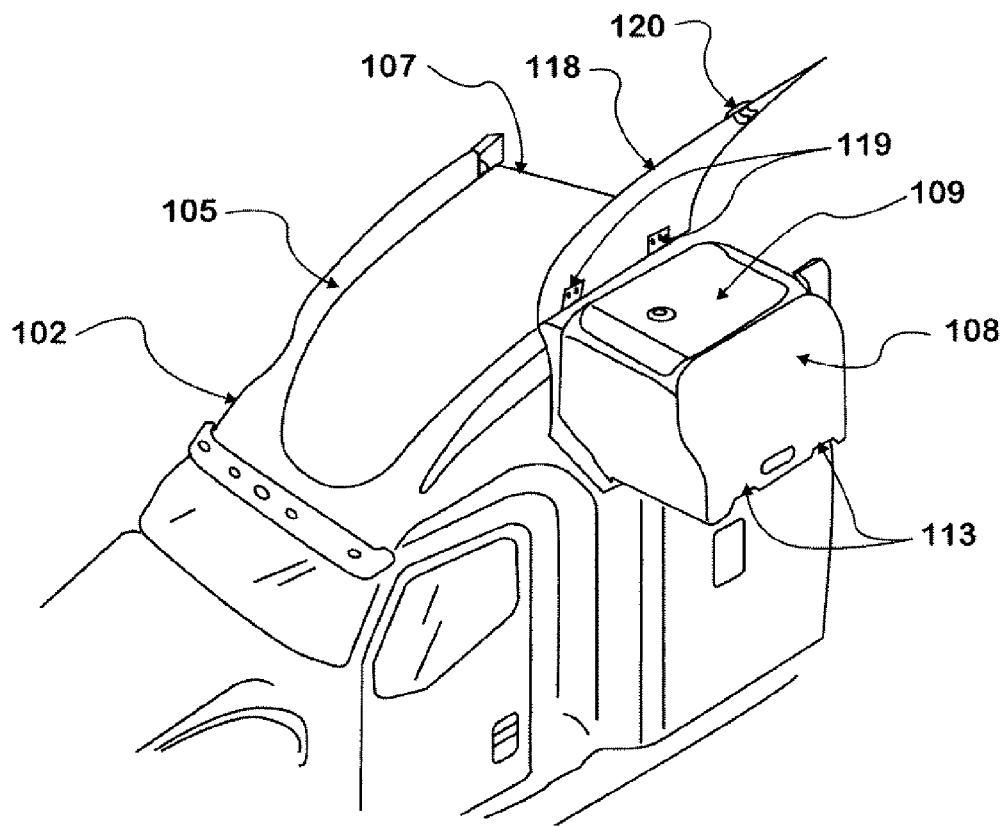
Figure 7:
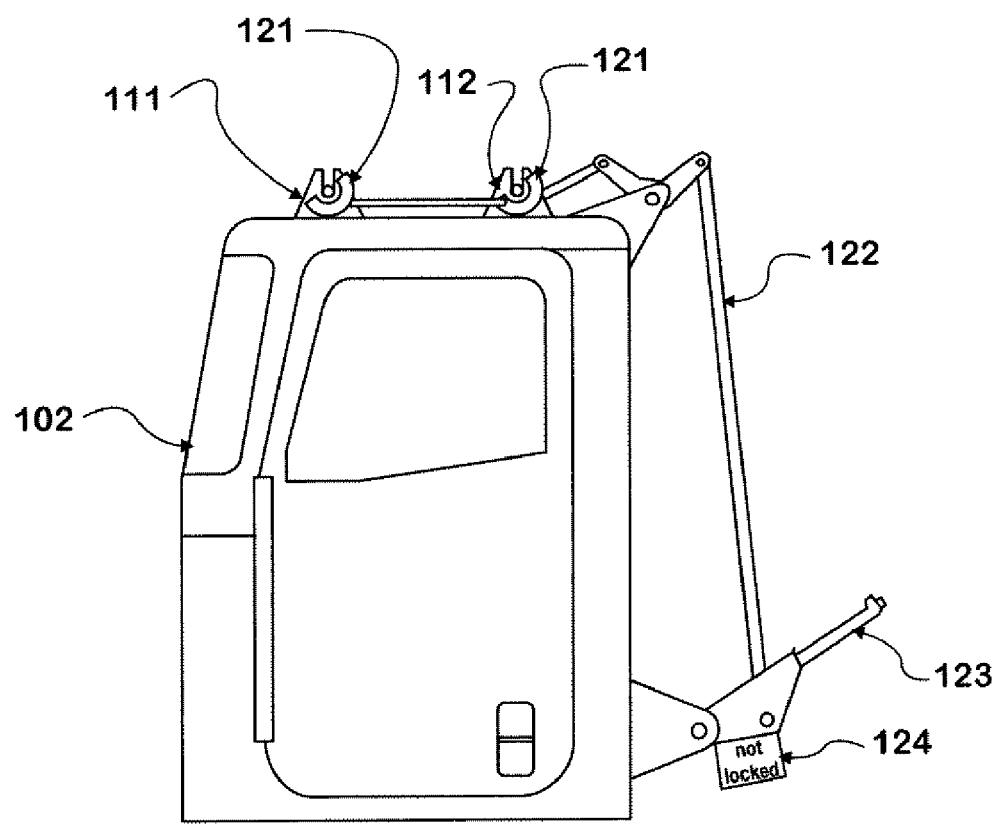
Figure 8:
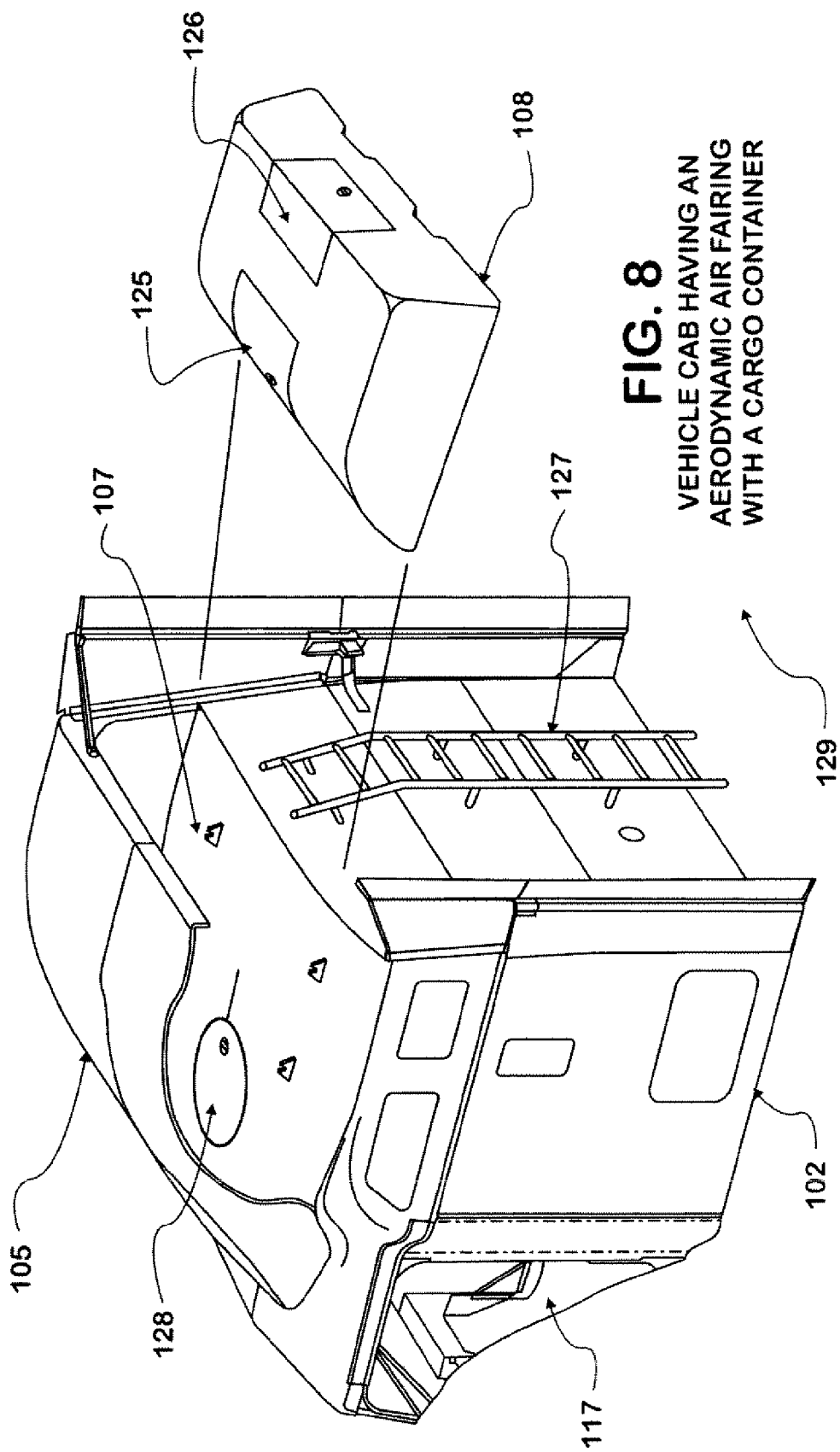
Figure 9:
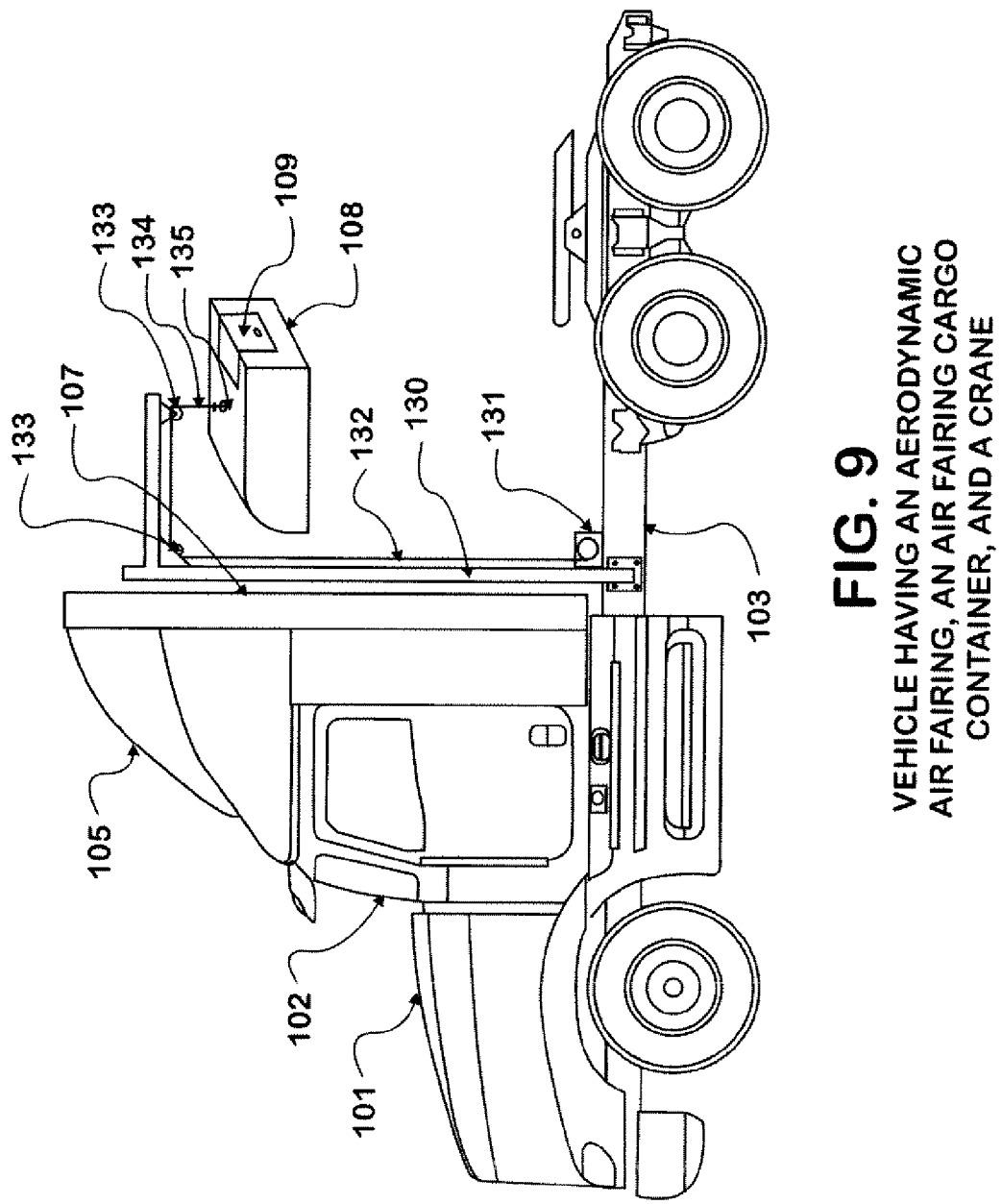
Figure 10:
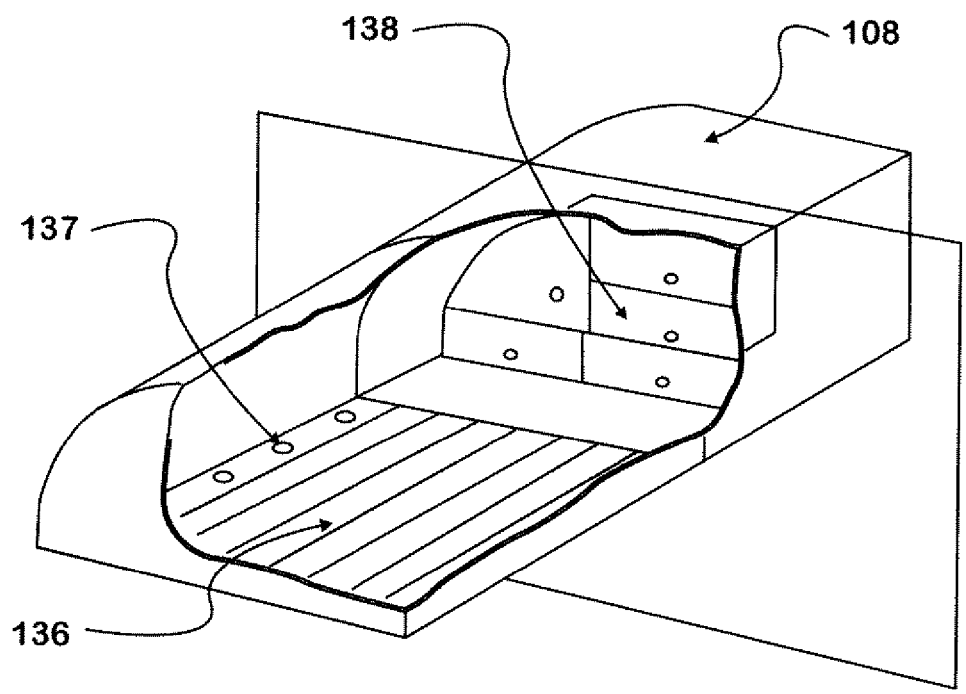

FIG. 3—A view of a first embodiment of the invention.
FIG. 4—A view of a second embodiment of the invention.
FIG. 5—A view of a third embodiment of the invention.
FIG. 6—A view of a fourth embodiment of the invention.
FIG. 7—A view of a fifth embodiment of the invention.
FIG. 8—A view of a sixth embodiment of the invention.
FIG. 9—A view of a seventh embodiment of the invention.
FIG. 10—A view of an eighth embodiment of the invention.

DETAILED DESCRIPTION

The vehicle 101 shown in FIG. 1 has a cab 102 and a cargo-carrying body section 104 attached to a chassis 103. The cab 102 is provided with an aerodynamic air fairing 105 in order to improve the airflow over and around the upper portion of the cargo-carrying body 104.

The vehicle 101 shown in FIG. 2 has a cab 102 attached to a chassis 103, and is adapted to pull a semi-trailer 106. Similar to the vehicle 101 in FIG. 1, the cab 102 of the vehicle 101 in FIG. 2 is provided with an aerodynamic air fairing 105 in order to improve the airflow over and around the upper portion of the semi-trailer 106.

FIG. 3 shows a partial view of a cab 102 having an aerodynamic air fairing 105. An air fairing cargo container 108, having an overall shape that is nestable within the aerodynamic air fairing 105, is shown projected from the cavity 107 formed by the aerodynamic air fairing 105 and the cab 102, into which cavity 107 the air fairing cargo container 108 is insertable. The air fairing cargo container 108 is provided with a hatch 109 by which access is provided to the interior thereof.

The vehicle 101 shown in FIG. 4 has a cab 102 attached to a chassis 103. In lieu of the aerodynamic air fairing 105, the cab 102 is provided with an aerodynamic cargo container 110. The aerodynamic cargo container 110 is removably attached to the cab 102 at forward mounting points 111 and rearward mounting points 112. The aerodynamic cargo container 110 is further provided with fork pockets 113, so that it may be easily removed from the cab 102 by use of a fork-truck. The aerodynamic cargo container 110 also possesses a hatch 109, similar to the air fairing cargo container 108 shown in FIG. 3.

FIG. 5 shows a cutaway view of a cab 102 having a partially integrated air fairing 114, the forward section 115 of which is open to the cab interior 117, and the rearward section 116 of which forms the air fairing cavity 107. An air fairing cargo container 108 is detachably mounted within the air fairing cavity 107, utilizing forward mounting points 111 and rearward mounting points 112.

FIG. 6 shows a partial view of a cab 102 having an aerodynamic air fairing 105 which is provided with a door 118 attached by means of hinges 119, said door being further provided with a latch mechanism 120 for releasably retaining it in the closed position. The door 118 allows access to the air fairing cavity 107, and allows the air fairing cargo container 108 to be removed perpendicular to the cab 102. In this way, the air fairing cargo container 108 may be inserted and removed upon a vehicle having a cargo-carrying body, or upon a highway tractor without requiring detachment of the semi-trailer. The air fairing cargo container 108 is again provided with a hatch 109 and fork pockets 113.

FIG. 7 shows a view of a cab 102 having forward mounting points 111 and rearward mounting points 112 for receiving either the air fairing cargo container 108 (not shown), or the aerodynamic cargo container 110 (not shown). The forward mounting points 111 and the rearward mounting points 112 are further provided with a latching mechanism 121, which is connected to a latching mechanism lever 123 by means of a latching mechanism linkage 122. A latching mechanism tell-tale 124 is attached to the latching mechanism lever 123 in such a way that it is displayed when the latching mechanism 121 is disengaged, and hidden when the latching mechanism 121 is engaged. Further, the latching mechanism 121 is configured in such a way that it will not move into the engaged position unless the air fairing cargo container 108 (not shown) or the aerodynamic cargo container 110 (not shown) is in the installed position. In this way, the latching mechanism tell-tale 124 provides positive feedback when the air fairing cargo container 108 (not shown) or the aerodynamic cargo container 110 (not shown) is secured.

FIG. 8 shows a partial view of a cab 102 having an aerodynamic air fairing 105 which is itself shown cutaway. An air fairing cargo container 108, having an overall shape that is nestable within the aerodynamic air fairing 105, similar to the air fairing cargo container 108 shown in FIG. 3, is shown projected from the cavity 107 formed by the aerodynamic air fairing 105 and the cab 102, into which cavity 107 the air fairing cargo container 108 is insertable. The air fairing cargo container 108 in FIG. 8 is shown with a forward hatch 125 and a rearward hatch 126, by means of which access is provided to the interior of the air fairing cargo container 108. Further, the cab 102 is provided with a ladder 127, by means of which access to the rearward hatch 126 is possible from the exterior of the cab 129 when the air fairing cargo container 108 is in the installed position, and a cab top hatch 128, by means of which access to the forward hatch 125 is possible from the cab interior 117 when the air fairing cargo container 108 is in the installed position. The cab 102 and the air fairing cargo container 108 may be provided with either the ladder 127 and the rearward hatch 126 respectively, the cab top hatch 128 and the forward hatch 125 respectively, or both the ladder 127 and the rearward hatch 126, and the cab top hatch 128 and the forward hatch 125.

The vehicle 101 shown in FIG. 9 has a cab 102 attached to a chassis 103, which cab 102 is provided with an aerodynamic air fairing 105. Similar to the foregoing embodiments, the vehicle 101 has an air fairing cargo container 108 having a hatch 109 and an overall shape that is nestable within the air fairing cavity 107 formed by the cab 102 and the aerodynamic air fairing 105. In order to allow for the autonomous loading and unloading of the air fairing cargo container 108, the vehicle 101 is further provided with a crane 130 attached to the chassis 103. The crane 130 is sized and located in such a way that it can position the air fairing cargo container 108 within the air fairing cavity 107, and yet is able to project the air fairing cargo container 108 away from the chassis 103 sufficiently that the air fairing cargo container 108 may be lowered to the ground. In a common manner, the crane 130 has a winch mechanism 131, pulleys 133, a cable 132, and a hook 134. The air fairing cargo container 108 is provided with a lifting eye 135 to be engaged with the hook 134, whereby the air fairing cargo container 108 may be lifted.

FIG. 10 is a composite cutaway view of an air fairing cargo container 108, showing two representative configurations of the interior thereof. The air fairing cargo container 108 is essentially split into two halves for conceptual purposes, the nearer half displaying the air fairing cargo container 108 having only a cargo floor 136 and tie-downs 137. In this configuration, the air fairing cargo container 108 is designed for general cargo stowage. The farther half of the cargo container 108 shown in FIG. 10 is provided with drawers 138. In the configuration with drawers 138, the air fairing cargo container 108 is designed for storage of driver's items, such as clothing and the like.

Other permutations of the invention are possible without departing from the teachings disclosed herein, provided that the function of the invention is to provide for additional cargo capacity within the space defined by a vehicle's air fairing and its cab, or alternately, by supplanting the vehicle air fairing with a substantially aerodynamic cargo container. Other advantages to a vehicle 101 equipped with an air fairing cargo container may also be inherent in the invention, without having been described above.

I claim:

1. A mobile vehicle for operation on the ground, comprising:
   a chassis;
   a cab attached to said chassis, said cab having a top side;
   an air fairing attached to said cab;
   an enclosed space defined by said top side of said cab and said air fairing;
   a cargo container adapted to fit into said enclosed space and removably attached to said cab, said cargo container having a means for accessing the interior thereof, said cargo container being further provided with fork pockets; and
   said air fairing further provided with a door, said door allowing access to and removal of said cargo container when open.

* * * * *